G. F. PLIMLEY.
Devices for Holding Pipe while being Joined Together.
No. 155,673. Patented Oct. 6, 1874.
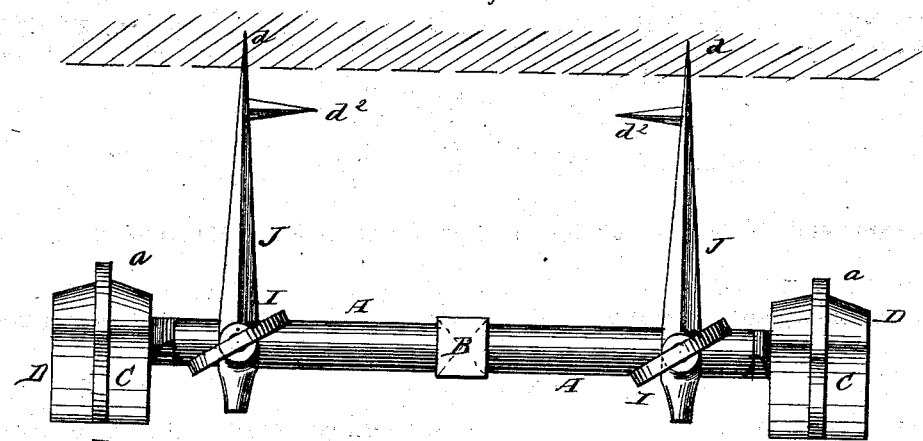
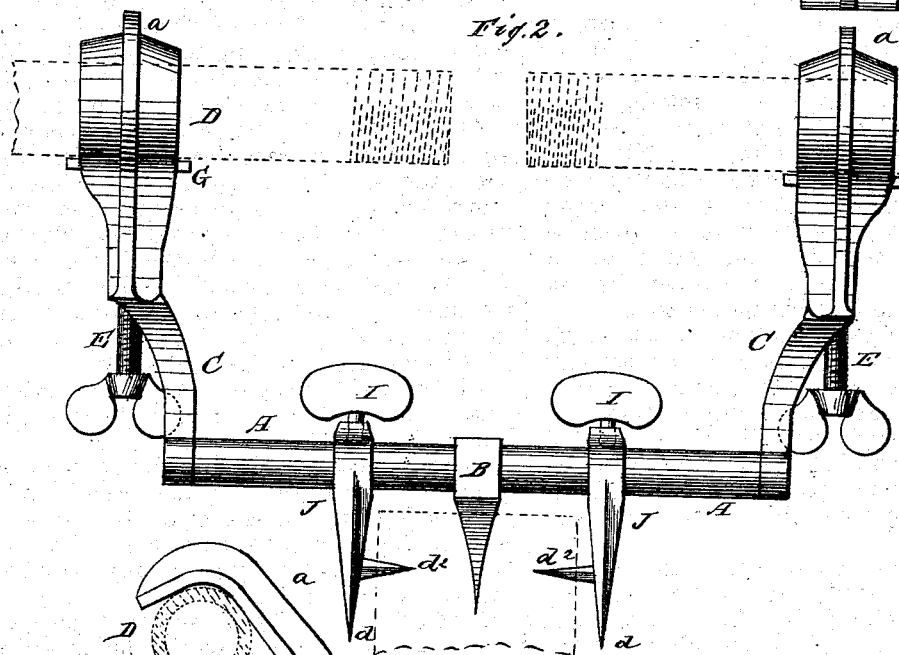
WITNESSES:
INVENTOR:
George F. Plimley
per
C. H. Watson & Co.
ATTORNEYS

UNITED STATES PATENT OFFICE.

GEORGE F. PLIMLEY, OF NEW YORK, N. Y.

IMPROVEMENT IN DEVICES FOR HOLDING PIPE WHILE BEING JOINED TOGETHER.

Specification forming part of Letters Patent No. 155,673, dated October 6, 1874; application filed September 3, 1874.

*To all whom it may concern:*

Be it known that I, GEORGE F. PLIMLEY, of New York, in the county of New York and State of New York, have invented a certain new and useful Device for Holding Pipes while Joining Them Together; and I do hereby declare that the following is a full, clear, and exact description thereof, which will enable others skilled in the art to which it pertains to make and use the same, reference being had to the accompanying drawings, and to the letters of reference marked thereon, which form a part of this specification.

The nature of my invention consists in the construction and arrangement of a machine for holding pipes while being joined together, as will be hereinafter more fully set forth.

In the annexed drawing, in which Figure 1 is a side elevation, Fig. 2 shows the device attached to a beam or piece of timber; and Fig. 3 represents the same with a bottom and side attachment.

A represents a round bar, of any suitable dimensions, provided in the center with a stationary sharp-pointed dog, B. At each end of the bar A is an arm, C, extending in a direction opposite to that of the dog B. These arms are curved slightly outward, and at their outer ends are formed the clamps D D. The clamps D are turned over forward, substantially in the form shown in the drawing, and a rib, $a$, is formed in the center on the outer side the entire length of the clamp, to make the same sufficiently strong. At the base of each clamp D is a projecting lug or ear, $b$, through which is passed a thumb-screw, E, said screw being on its upper or inner end provided with a swiveled button, G, for holding the pipe securely in the jaws or clamps D D. On the bar A, on each side of the stationary jaw B, is placed a movable dog, J, fastened at any desired point on the bar by means of the set-screw I. Each dog J has three points, $d\ d^1\ d^2$, the point $d$ being the end of the dog, the point $d^1$ projecting inward, and the point $d^2$ to one side, as shown in the drawing.

This machine may be held firmly in any desired position, wherever needed, by inserting the stationary dog B and then adjusting the movable dogs J J so as to force or insert their proper points, after which said movable dogs are fastened to the bar A by the thumb-screws I. The pipes to be joined together are then fastened in the clamps by screwing up the thumb-screws E, after which the pipes are joined together in the usual manner.

Having thus fully described my invention, what I claim as new, and desire to secure by Letters Patent, is—

1. The curved jaws D D, provided with longitudinal exterior ribs $a\ a$, and formed on the outer ends of the arms C C of the bar A, in combination with the thumb-screws E E and swiveled buttons G G, substantially as and for the purposes herein set forth.

2. The movable dogs J, adjusted and held on the bar A by means of the thumb-screws I I, and provided with the points $d\ d^1\ d^2$, substantially as and for the purposes herein set forth.

3. The combination of the bar A with arms C C and clamps D E G, the stationary dog B, and adjustable dogs J, having points $d\ d^1\ d^2$, all constructed substantially as and for the purposes herein set forth.

In testimony that I claim the foregoing as my own I affix my signature in presence of two witnesses.

G. F. PLIMLEY.

Witnesses:
JOHN URIAN,
JOHN CUNINGHAM.